Aug. 27, 1929.  G. NAISMITH ET AL  1,725,879
FURNACE
Filed Dec. 24, 1927  4 Sheets-Sheet 2
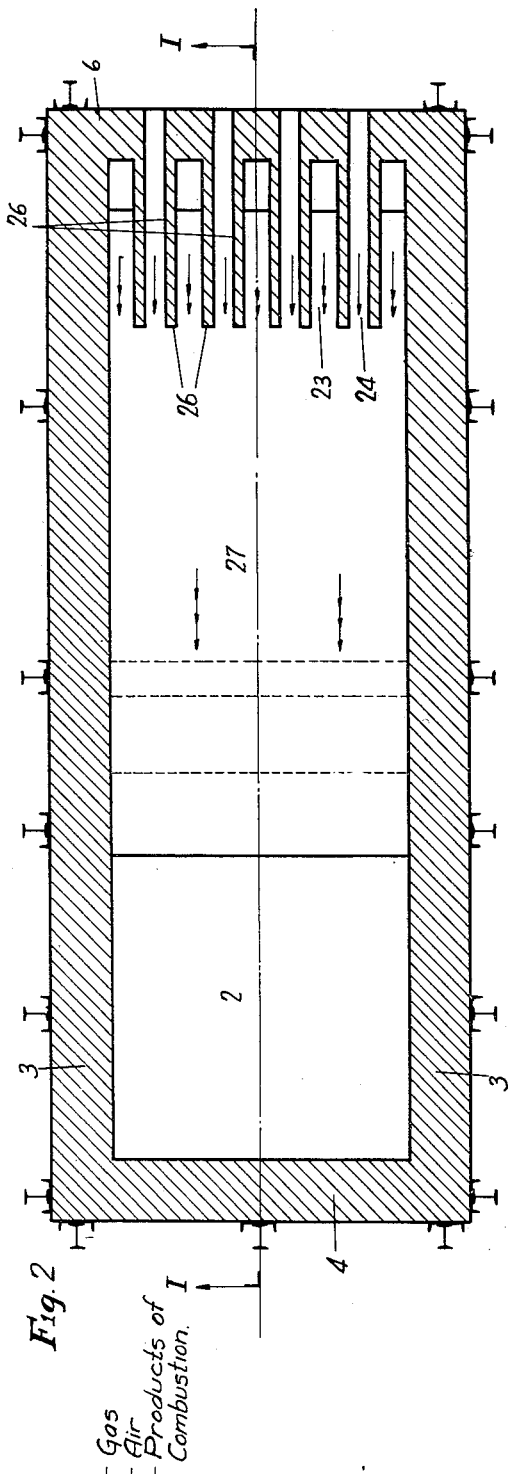
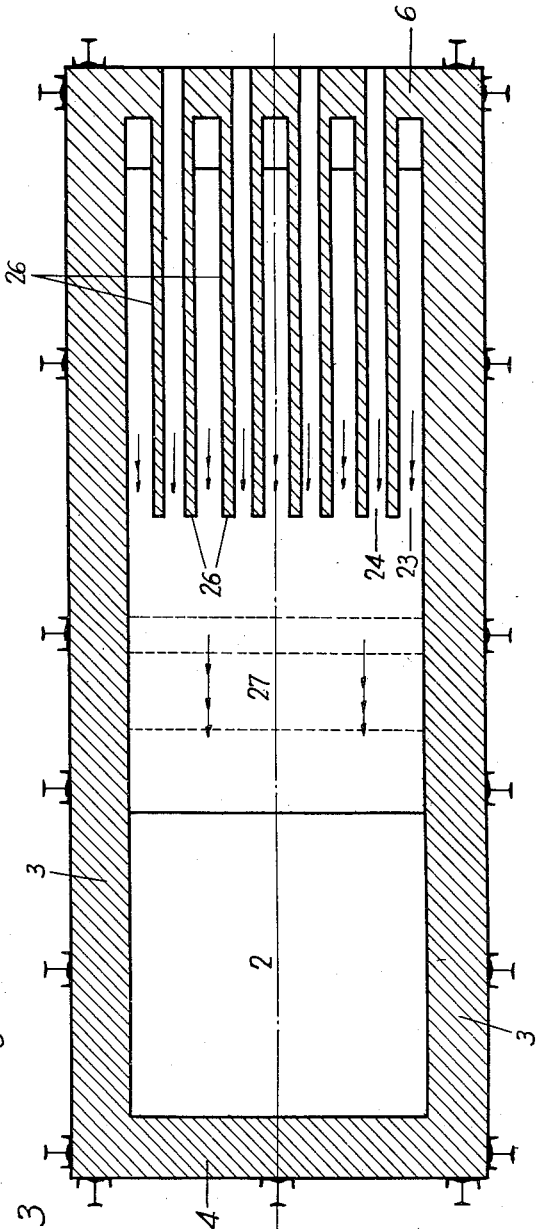

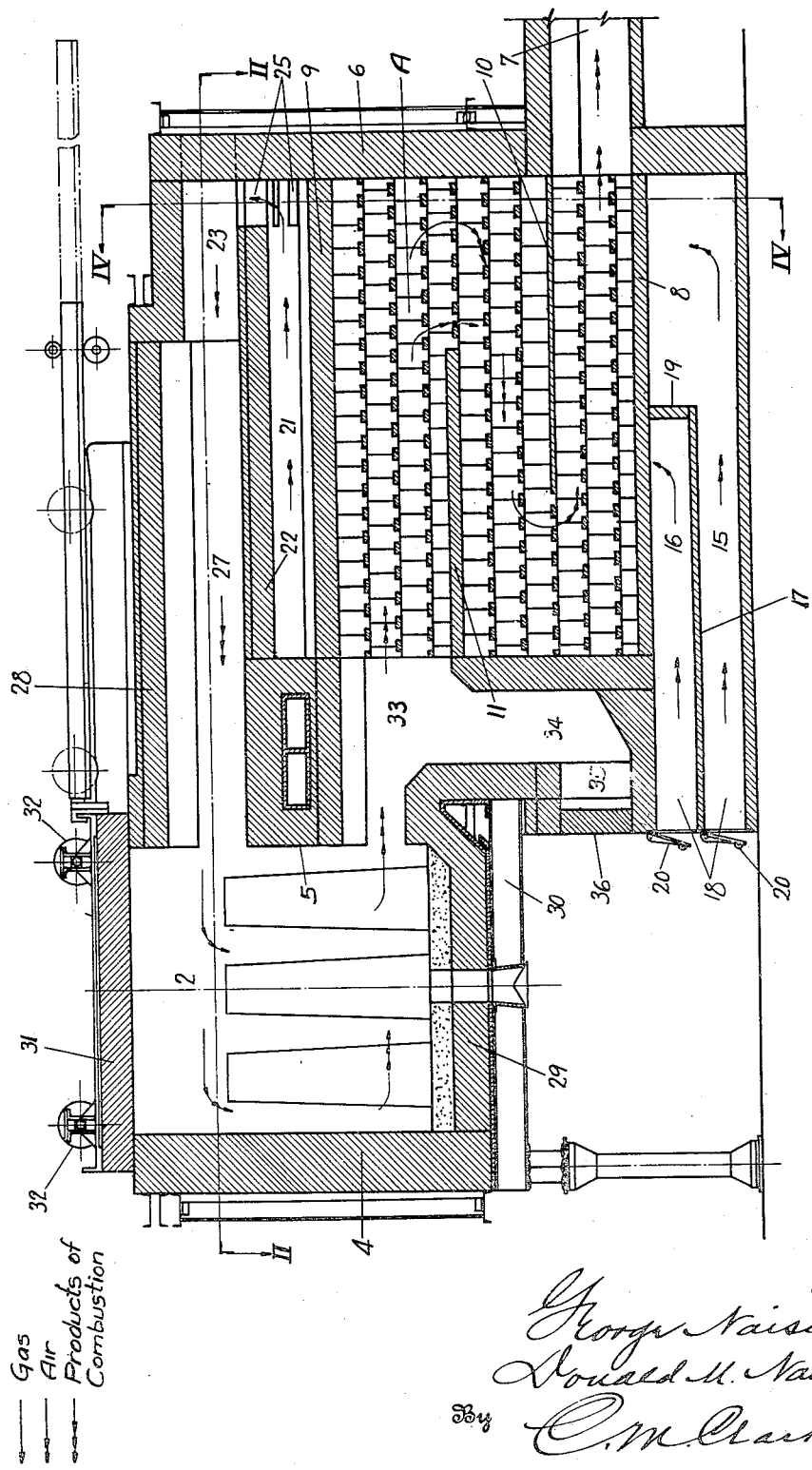

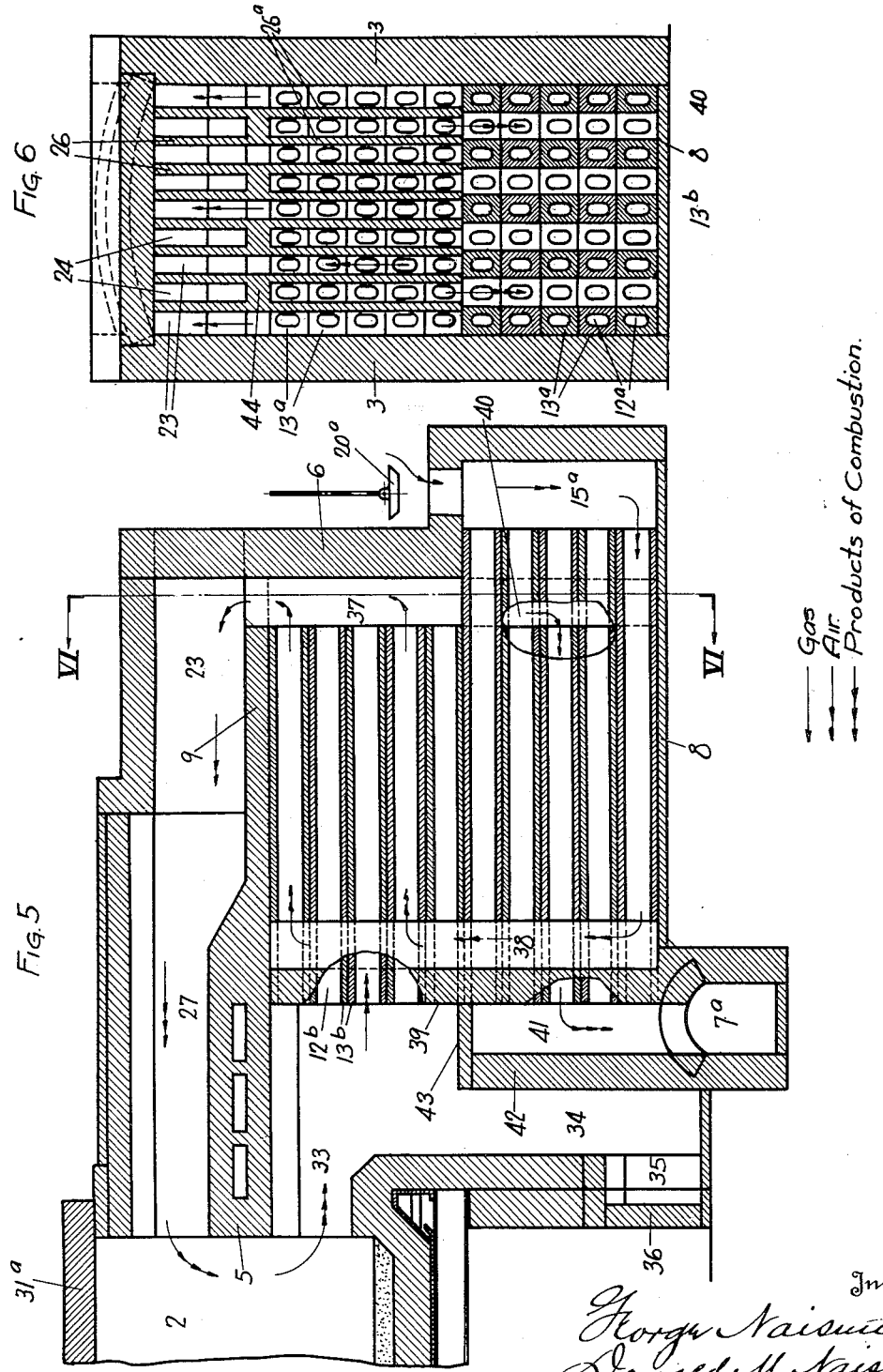

Patented Aug. 27, 1929.

1,725,879

UNITED STATES PATENT OFFICE.

GEORGE NAISMITH AND DONALD M. NAISMITH, OF PITTSBURGH, PENNSYLVANIA.

FURNACE.

Application filed December 24, 1927. Serial No. 242,312.

Our invention is an improvement in heating furnaces of the recuperative type particularly adapted to the heating of ingots and the like within a soaking pit or chamber.

It has in view to provide a recuperative furnace construction in which the fuel gases are introduced horizontally into a common mixing and combustion chamber, for combination with pre-heated air and resulting circulation of the combustion gases down into, downwardly through, and out of a soaking pit chamber, with subsequent circulation of the waste gases of combustion in alternating paths through a recuperator to the stack.

The construction also provides for circulation of air upwardly through conducting conduits, alternating with the waste gas circulation conduits for heating of the air, and final combination of heated air with the fuel gas, together with various other detail features of construction, as shall be more fully hereinafter described.

The heating chamber or soaking pit receives the incoming fuel gas and air in combustion at its upper portion and discharges the waste gases at the same side, from the lower portion of the chamber, through which the gases circulate continuously without the use of reversing valves, for continuous operation.

In the drawings showing certain preferred embodiments of the invention:

Fig. 1 is a longitudinal vertical section through the furnace, on the line I—I of Fig 2;

Fig. 2 is a horizontal section, on the section line II—II of Fig. 1;

Fig. 3 is a similar sectional view showing a modified arrangement of the alternating hot air and gas flues;

Fig. 5 is a partial longitudinal sectional view similar to Fig. 1, showing a modified construction;

Fig. 6 is a vertical cross-section on the line VI—VI of Fig. 5.

Figure 4:
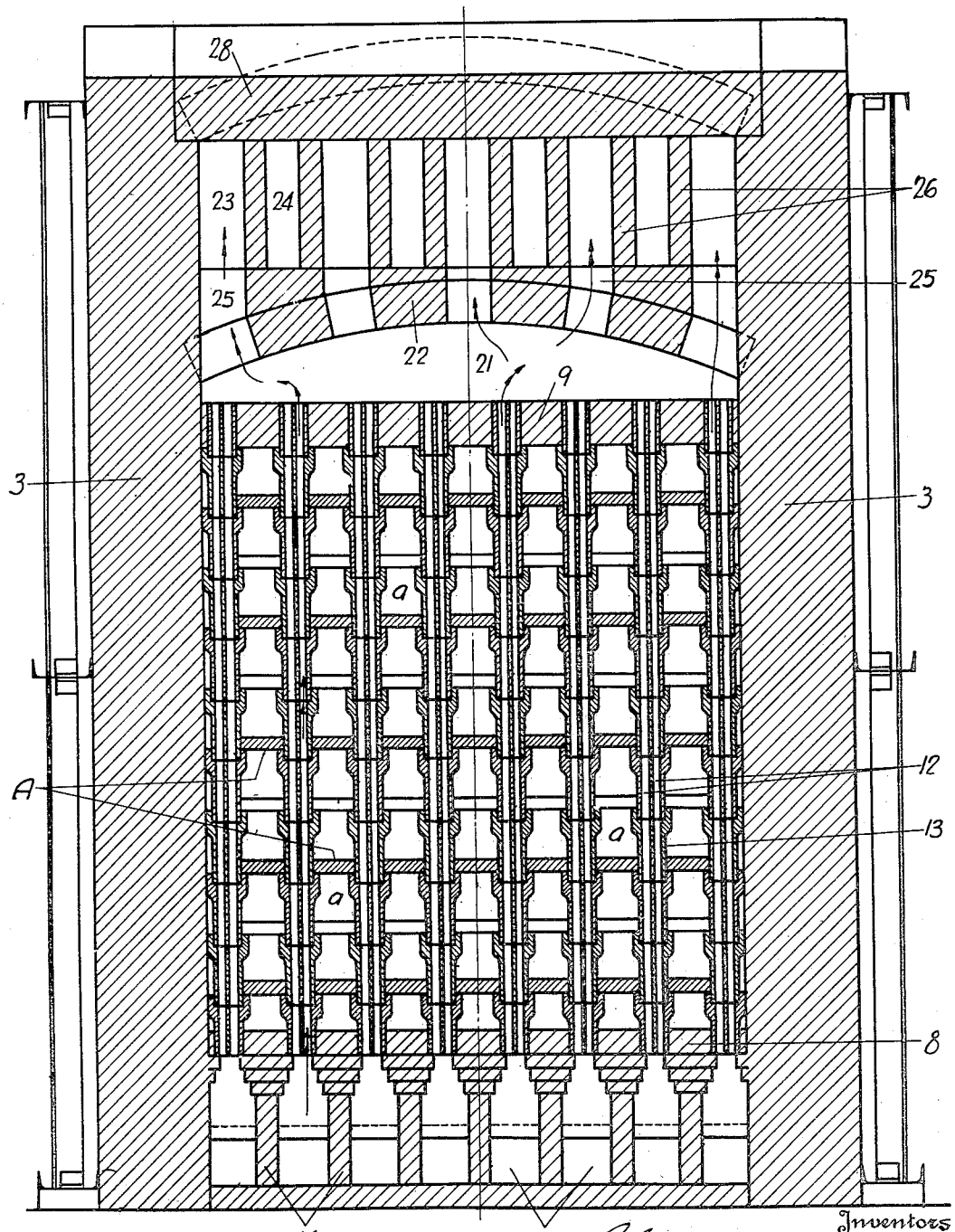
Fig. 4 is an enlarged vertical sectional view, on the line IV—IV of Fig. 1.

The soaking pit or heating chamber 2 of the furnace is of generally rectangular construction within side walls 3, 3, outer end wall 4, and an inner transverse partition 5, interrupted above and below by the incoming and outgoing fuel and waste products openings respectively.

The partition 5 thus provides a partial closure of the heating chamber, forming the end wall of the recuperative portion of the furnace, which is also enclosed between the main side walls 3 and the opposite end wall 6.

The main body portion of the furnace structure between the middle transverse wall 5 and the end wall 6 is occupied by vertically arranged series of air recuperator blocks A of any suitable construction, providing for circulation of the waste gases therebetween in their progress toward the final outlet delivery conduit 7, leading to the stack.

The air recuperator blocks A extend vertically from a supporting base 8 upwardly to a transverse closing wall 9, the air recuperator blocks being laid in a manner best adapted to provided interrupted paths for the outgoing gases.

For the purpose of providing an alternating or tortuously reversed path for the gases, thereby insuring more complete contact and a degree of baffling, we interpose a plurality of alternately arranged horizontal partitions 10 and 11, as shown in Fig. 1, providing the circulation indicated by the arrows.

For the purpose of heating the incoming air, series of independent air conducting channels 12 are provided by means of vertically arranged series of hollow tiles 13 extending upwardly through the recuperator chamber for the full width of the recuperator chamber, and alternating with the intervening waste gas circulation spaces $a$, as in Fig. 4.

The conducting tiles for the air are arranged in vertical series as shown, each tile fitting by one end into the shouldered terminal of a next adjacent tile, the shoulders thereof providing lateral supports for the transversely laid checkers A, and also for the partitions 10 and 11.

By such construction, the air conduits extend continuously from below the bottom supporting floor portion 8 to the upper transverse roof member 9, so that the several air conduits carry the air upwardly in intimate relation with the waste gas channels whereby the air absorbs the heat therefrom.

Bottom floor partition 8 is supported upon a series of longitudinally arranged piers 14 providing intervening incoming air circulating and supply ports or channels 15 and 16 respectively.

Said channels are superimposed one above the other with an intervening horizontal partition 17, extending from their incoming air openings 18 underneath the floor 8. Channel 15 as shown extends clear to the opposite end wall 6 and discharges upwardly into the air conduits 12, between such end wall and a partition 19, at the end of upper air passage 16, while channel 16 furnishes air in the same manner to the remainder of the chamber beyond partition 19.

Passages 15 and 16 discharge upwardly through the inner middle portion of the air conduits 13, so that by such supply and distribution, air may be furnished throughout the full extent of the air conduits from one end to the other of the recuperative chamber and continuously subject to the heating action of the outgoing waste gases.

While the air may be supplied to the individual vertical series of hollow tiles 13 in any suitable manner, in the construction shown, channels 15 and 16 are in superimposed horizontal series corresponding to the longitudinal series of vertically arranged tiles 13 and their air conducting ports 12. Each channel 15 and 16 is provided with a closing door 20 adapted to be partly or wholly opened, as to each particular channel, whereby to regulate the amount of incoming air for proper distribution throughout the entire series of air supply and heating conduits.

Upwardly above roof partition 9 is a common air collecting chamber 21 between the roof 9 and a transverse arched partition 22, extending across the full width of the space between walls 3, 3, from the heating chamber 2 toward the opposite end wall 6, and terminating at the point of supply of the alternating heated air and gas supply conduits 23 and 24.

Upper delivery air conduits 23 communicate with the main hot air collecting chamber 21 by upwardly extending flues 25 through the arched roof 22, immediately inside of end wall 6. Gas supply ports 24 alternate with the air supply flues 23 by means of intervening partition walls 26, as in Figs. 2, 3 and 4. Gas may be supplied to flues 24 by independent pipes or any other suitable means, as a common supply manifold communicating with all of the gas flues.

As shown in Fig. 2, the alternating air and gas flues extend inwardly for a definite distance from the end wall 6, delivering their supply volumes of air and gas into the common horizontal mixing and combustion chamber 27, leading horizontally from such point to the upper portion of the heating chamber 2.

Chamber 27 is covered by a transverse arch 28 co-extensive with the chamber and covering it between the side walls, whereby the mixer and combustion chamber is substantially co-extensive with the width of the heating chamber, as shown.

The heating chamber 2 is provided with a supporting bottom floor construction 29 carried outwardly beyond the main wall or front portion or middle end portion 5 on a structural supporting platform 30 with suitable reinforcing buckstaves etc., as is usual in such construction. A removable cover 31 provided with carrying wheels 32 is adapted to be moved along a supporting trackway for opening and closing the furnace, as indicated in Fig. 1.

Furnace chamber 2 as shown communicates at its lower portion by a common transverse opening 33 with the upper portion of the recuperator A, and a downwardly extending well or cavity 34 is provided for collection of slag, etc. Any accumulation of foreign matter in the bottom portion of chamber 34 may be removed through an opening 35 at the base of transverse wall 5 and having a suitable cover or door 36.

The construction and operation of the furnace as above described will be readily understood from the foregoing description. Air entering channels 15 and 16 or either of them, passes upwardly through the series of vertical conduits 12 for admixture with the gas and resulting combustion, and circulation through the heating chamber 2.

The waste gases pass in a tortuous path outwardly through the spaces $a$ between the series of recuperator blocks A and hollow tiles 13, and finally to the stack conduit 7.

When it is desired to vary the length of the mixing portion of the chamber 27, the partition walls 26 may be elongated, with corresponding elongation of the independent air and gas conduits 23, 24, prior to admixture, as shown in Fig. 3.

By such arrangement it will be seen that the relative proportions of the independent supply channels 23, 24, and of the common mixing and combustion chamber 27 may be varied more or less with corresponding variation in the point of ignition of the fuel, and with a definite resulting relation and effect as to the heating action in the chamber 2.

By the construction as shown and described it will be observed that the combustion chamber 27 is located immediately over the common air chamber 21, thereby further assisting in final heating of the air, while chamber 21 is also immediately above the full length of the circulating space for the heated gases, thereby utilizing and economizing the full value of the waste heat.

Figs. 5 and 6 show a modified construction in which the same general arrangement of heating furnace, pre-heating air circulating means, delivery of the air and gas for combustion, etc., are utilized in the same manner generally, as above described.

In such construction, however, we utilize hollow tiles laid in horizontal longitudinal series, end to end, providing continuous circulating openings for the air between similar continuous circulating openings for reversely moving waste gases, with endmost vertical communicating chambers. The main elements of the furnace are identified by similar numerals wherever they correspond, the modified portions being correspondingly marked with the exponent "a" as far as possible.

The pre-heated air enters a supply chamber 15$^a$ under control of valve 20$^a$ and passes horizontally through the registering openings 12$^a$ of a bank of alternating series of abutting tile or blocks 13$^a$ across underneath a similar upper bank, through which the air passes in the opposite direction, to vertical collecting and supply flues 37. Flues 37 are in registering connection with the upper horizontal hot air supply ports 23 leading between alternating gas ports 24 to the mixing and combustion chamber 27. At their inner ends the air conducting tiles 13$^a$ terminate at and deliver into vertically registering flues 38 extending from the floor 8 up to the top of the upper bank of reversely circulating tiles, between their ends and an inner vertical partition wall 39.

Alternating between the up-going air conducting hollow tiles 13$^a$ are similar series of waste gas conducting tiles 13$^b$ having registering openings 12$^b$. These extend inwardly beyond tiles 13$^a$ through partition wall 39 and communicate with the common gas outflow flue or channel 33 leading from heating chamber 2 and communicating with the well 34. At their opposite ends the waste gas conducting tiles 13$^b$ terminate flush with the ends of air conducting tiles of the upper bank and on the same vertical plane below, for the full depth of common down circulating flues 40. These gas tiles alternate between the outwardly extended air conducting tiles and extend inwardly through the partition wall 39 to downwardly extending flues 41 leading to outlet stack flue 7$^a$. Flues 41 are confined and separated from well 34 by a partition wall 42 and a covering top 43.

The upper portions of flues 40 are closed off from gas ports 24 by cross partitions 44 and from the side-by-side air channels 37 by downward extensions 26$^a$. These extend downwardly throughout the depth of the upper bank of air conducting tiles from where the gas flues continue between the walls of the latter.

All of the waste gas flues 40 thus pass downwardly in front of the several series of vertically arranged exhaust gas tiles 13$^b$ and form connecting passages for waste gases from the upper bank to the lower. Products of combustion from furnace 2 pass through channel 33 and inwardly through openings 12$^b$ of all of the hollow tile 13$^b$ above closing wall 43, then through the upper bank of such tile and downwardly by flues 40 to the lower bank, through which the gases pass to flue 41 and stack conduit 7$^a$.

With either construction, the waste gases not only pass through conduits in close intimate juxtaposition with alternating incoming air conduits, but also in a back and forth reversing path of travel in their circulation towards the stack. The entire body portion of the recuperative elements of the furnace is thus confined within a limited cavity, between the side walls, with delivery of heated air upwardly between the gas conduits, for discharge into the common mixing and combustion chamber 27 leading to the furnace chamber 2.

The construction and operation of the furnace will be readily understood from the foregoing description. Pre-heated air mixes with incoming fuel gas immediately beyond the terminals of partitions 26, and the length of the partitions may be varied as desired to lengthen or shorten the mixing and combustion chamber 27.

The furnace may be operated continuously without reversal or control of the gas and air other than as to volume, with capacity for accurate regulation of each for the best and most economical practice, while the construction as a whole is simple, economical and easily repaired when necessary.

What we claim is:—

1. A furnace having an outwardly enclosed heating chamber provided at its inner side with an inlet and an outlet port for heating gases, gas supply conduits leading from the opposite end of the furnace on a horizontal plane to the inlet port, and intervening air supply conduits.

2. A furnace having an outwardly enclosed heating chamber provided at its inner side with an inlet and an outlet port for heating gases, a continuously horizontal mixing chamber leading to the inlet port, and a series of alternating gas and air supply conduits leading to the opposite end of the mixing chamber.

3. In a furnace, the combination with enclosing walls providing a heating chamber having at its inner side a laterally extending mixing chamber, a series of partitions extending into the mixing chamber at the opposite outer end of the furnace, all terminating on a common transverse plane, means for supplying fuel gas to alternate channels between said partitions, and means for supplying pre-heated air to the intervening channels thereof for admixture with the gas beyond the partitions.

4. In a furnace, the combination with enclosing walls providing a heating chamber having at one side an upper mixing and supply chamber and a lower outlet conduit, a series of partitions extending into the mixing chamber at the opposite outer end of the furnace providing alternating gas and air channels, means for supplying fuel gas to the gas channels, and recuperative waste gas and air conducting means directly below the mixing chamber providing outward circulation of waste gases from the outlet conduit of the heating chamber and inward circulation of air therethrough to the air channels between said partitions.

5. In a furnace, the combination with enclosing walls providing a heating chamber having at one side a horizontal mixing and supply chamber and an outlet conduit, a series of partitions extending into the outer end of the mixing chamber providing alternating side-by-side gas and air channels, means for supplying fuel gas to the gas channels, and recuperative waste gas and air conducting means located directly below the mixing and supply chamber providing series of channels for outward circulation of waste gases from the outlet conduit of the heating chamber and intervening channels for incoming air in circulating connection with the air channels between said partitions.

6. A furnace having an enclosed heating chamber provided at one side with an upper inlet port and a lower outlet port, a common horizontal upper mixing chamber leading to the inlet port, means supplying gas to the outer portion thereof, a lower recuperator chamber providing passages communicating with the outlet port for circulation of waste gases therethrough and closely adjacent horizontal alternating passages for incoming air, and a common hot air collecting chamber between the recuperator chamber and the mixing chamber directly below the mixing chamber and in circulating connection with both chambers.

7. In a furnace having an outwardly extending heating chamber provided at its inner side with a horizontal mixing chamber and an inlet opening, and an outlet opening leading from the lower portion of the heating chamber to a recuperative chamber directly below the mixing chamber, recuperative means providing a plurality of banks of alternating waste gas circulating channels communicating with the outlet opening and a discharge conduit, with intervening incoming air circulating channels between the waste gas channels communicating with the outer end of the mixing chamber, and means supplying fuel gas to the outer end of the mixing chamber for mixture with heated air therein.

8. In a furnace having an outwardly extending heating chamber provided at its inner side with a horizontal mixing chamber and an inlet opening, and an outlet opening leading from the lower portion of the heating chamber to a recuperative chamber directly below the mixing chamber, recuperative means providing a plurality of banks of alternating waste gas circulating channels communicating with the outlet opening and a discharge conduit, with intervening incoming air circulating channels between the waste gas channels communicating with the end of the mixing chamber, and partitions extending inwardly of the horizontal mixing chamber at its outer end providing alternating air and fuel gas passages for supply and admixture within the mixing chamber.

In testimony whereof we hereunto affix our signatures.

GEORGE NAISMITH.
DONALD M. NAISMITH.